(12) United States Patent
Hall et al.

(10) Patent No.: US 7,164,535 B2
(45) Date of Patent: Jan. 16, 2007

(54) OPTICAL COATING AND CONFIGURATION FOR TAILORED SPECTRAL CHARACTERISTICS OVER VIEWING ANGLE

(75) Inventors: Randolph L. Hall, Newbury Park, CA (US); William Southwell, Thousand Oaks, CA (US)

(73) Assignee: Teledyne Licensing, LLC, Thousand Oaks, CA (US)

(*) Notice: Subject to any disclaimer, the term of this patent is extended or adjusted under 35 U.S.C. 154(b) by 5 days.

(21) Appl. No.: 10/956,230

(22) Filed: Sep. 30, 2004

(65) Prior Publication Data

US 2005/0078375 A1   Apr. 14, 2005

Related U.S. Application Data

(60) Provisional application No. 60/507,603, filed on Sep. 30, 2003.

(51) Int. Cl.
*G02B 1/10* (2006.01)
(52) U.S. Cl. ............ 359/581; 359/589; 359/584
(58) Field of Classification Search ......... 359/580–590
See application file for complete search history.

(56) References Cited

U.S. PATENT DOCUMENTS

| | | | |
|---|---|---|---|
| 4,666,250 A | 5/1987 | Southwell | 350/166 |
| 4,756,602 A | 7/1988 | Southwell et al. | 350/166 |
| 4,832,448 A * | 5/1989 | Jones | 359/581 |
| 4,952,025 A | 8/1990 | Gunning, III | 350/164 |
| 5,000,575 A | 3/1991 | Southwell et al. | 356/382 |
| 5,181,143 A | 1/1993 | Southwell | 359/586 |
| 5,410,431 A | 4/1995 | Southwell | 359/580 |
| 6,984,038 B1 * | 1/2006 | Ishak | 351/163 |

FOREIGN PATENT DOCUMENTS

JP   2003-177319   * 6/2006

* cited by examiner

*Primary Examiner*—Leonidas Boutsikaris
(74) *Attorney, Agent, or Firm*—Koppel, Patrick & Heybl

(57) ABSTRACT

An optical system employs an optical coating on a substrate positioned relative to an optical collection system. The thickness of the coating is tailored such that light perceived by the collection system over prescribed angles of acceptance has a spectral content that is unchanged, or changed in a prescribed manner, from that entering the system when the sensor is oriented in the "look ahead" direction. The thickness of the coating is varied so that the wavelengths transmitted or reflected correspond to those required by a specific application. The invention is adaptable to system requirements that are centered about a single wavelength, or that require multiple wavelengths. The optical coating can take any of a number of forms, including stacked dielectric layers and rugate filters.

33 Claims, 3 Drawing Sheets

OPTICAL COATING AND CONFIGURATION FOR TAILORED SPECTRAL CHARACTERISTICS OVER VIEWING ANGLE

This application claims the benefit of provisional patent application No. 60/507,603 to Hall and Southwell, filed Sep. 30, 2003.

This invention was made with Government support under Contract F33615-97-C-5400 awarded by the Air Force. The Government has certain rights in this invention.

BACKGROUND OF THE INVENTION

1. Field of the Invention

This invention relates to the field of optical coatings, and particularly to optical coatings where wide field-of-view is required.

2. Description of the Related Art

Optical thin film interference coatings are used in many applications where the spectral content of light is important. When applied to a surface in an optical system, such coatings allow some wavelengths to be transmitted and other wavelengths to be reflected. Common applications include antireflection coatings that transmit all relevant wavelengths with high efficiency, bandpass filters that allow only a specified spectral region to be transmitted and to reflect other wavelengths, and notch filters where specific wavelengths are reflected while other wavelengths are transmitted. Such coatings are well known, and are described, for example, in U.S. Pat. No. 4,756,602 to Southwell et al. and U.S. Pat. No. 4,666,250 to Southwell.

All of these optical coatings suffer from an angle-of-incidence (AOI) dependent spectral response. This change in performance is a result of the changing path length, for light propagating in the optical coating, of the light as a function of the incident angle. This applies to all optical interference coatings no matter the application, including antireflection, bandpass, bandstop, and high reflection applications.

In many applications, this shift in the spectral properties of the optical coating is undesirable. In these applications, the desire is to have a very wide field-of-view where the spectral properties do not change as a function of incidence angle on the coating.

Applications where wide field-of-view are important include:

1. Optical sensors on a gimbal placed behind a window. The sensor can change its viewing direction over a wide range of angles, in each case viewing through a different area of the window. A uniform coating on the window will have different spectral characteristics for the light that impinges on the sensor depending on the direction in which the sensor is pointed. Also, light coming through any fixed portion of the window that originates from different locations will impinge on the window from different directions and have different spectral characteristics imposed on it.

2. A head mounted display (HMD) with a see-through beam combiner where the projected image is reflected into the users eyes using a fixed (e.g., CRT, LCD) or scanning (e.g., laser, laser diode) image source. These beam combiners are designed to operate at a non-normal angle of incidence and, based on their proximity to the user's eyes, can be required to provide constant spectral performance over wide viewing angles. The coatings on the beam combiner are designed to reflect specific wavelengths of the HMD display and transmit the external scene to the user. The reflected display wavelengths will have a different spectral response depending on the specific location on the beam combiner where the light is reflected. This can cause the beam combiner reflection band, as perceived by the eye, to shift relative to the display wavelengths, reducing the display intensity perceived by the user and changing the spectral content of the external scene as viewed by the wearer. These changes in intensity and spectral content will vary with location on the beam combiner as determined by the relative angle between any given location and the pupil of the eye.

3. Spectacles or sunglasses having coatings that tailor the spectral content of the transmitted light. An example might be optical coatings that are applied to sunglasses to preferentially transmit those wavelengths for which the eye has greater visual acuity. For example, these glasses are important for hunters and sportsmen. Light transmitted at different locations and at different angles would have a different spectral content, which can be perceptible to the user.

Many other applications will be readily apparent to those skilled in the art.

SUMMARY OF THE INVENTION

A solution to the problems noted above is the subject of this invention, where the optical coating on the external window or lens is designed so that the spectral behavior of the coating shifts with location on the window so that when the optical collection system (human eye, gimbaled optical sensor) rotates to allow the system pupil to be positioned to collect light that enters through a different portion of the window or lens, the light entering through the window or lens at "prescribed angles of acceptance", the optical sensor sees a spectral content that is unchanged, or changed in a prescribed manner from that entering the combined system when the sensor is oriented in the "look ahead" direction. The tailored coatings are also effective when the optical system is oriented in the "look ahead" position.

The present invention varies the thickness of an optical interference coating applied to a substrate (e.g., a window or lens) through or on which the optical sensor detects light via transmission or reflection. In one example, the window/lens with the tailored optical coating is positioned relative to the optical sensor (gimbaled sensor or eyeball), such that the sensor is free to rotate on an axis through its center such that the system pupil sweeps out an arc behind the fixed window/lens. Stabilization of the optical coating from the system perspective is accomplished using a thickness-tailored optical interference coating that overcomes the problems noted above, stabilizing the spectral reflectance and spectral transmittance of incident radiation over the prescribed angles of acceptance for predetermined AOI.

The thickness of the present coating is varied so that the wavelengths transmitted or reflected correspond to those required by the specific application. The invention is adaptable to system requirements that are centered about a single wavelength, or that require multiple wavelengths (such as blue, green and red that might be used in a display application). The optical coating can take any of a number of forms, including stacked dielectric layers and rugate filters.

The tailoring of the optical coating's spectral properties is accomplished by depositing the coating in a manner such that its thickness, including the individual layers of the coating, vary with spatial position on the window/lens in a prescribed fashion. For example, when constant spectral behavior is desired, the coating thickness increases with radial position on the optic. Radial position is determined from the nominal 'forward-look' direction of the optical system.

Those skilled in the art will realize that additional applications exist where a nonuniform spectral response is desired, or where spectral variation is desired in only one dimension rather than two. In these cases, the overall principle remains the same, but the variation of thickness, and hence the spectral characteristics with position, may be tailored in other fashions than increasing with radial distance from a central point.

The tailored nature of the present coating enables an optical system that makes it possible for a user of a properly-coated helmet-mounted display beam combiner, for example, to accurately perceive the displayed content over a large display area, or for an eyeglass or sunglass wearer to perceive only predetermined wavelengths regardless of the direction in which they are looking.

Further features and advantages of the invention will be apparent to those skilled in the art from the following detailed description, taken together with the accompanying drawings.

DETAILED DESCRIPTION OF THE INVENTION

Figure 1:
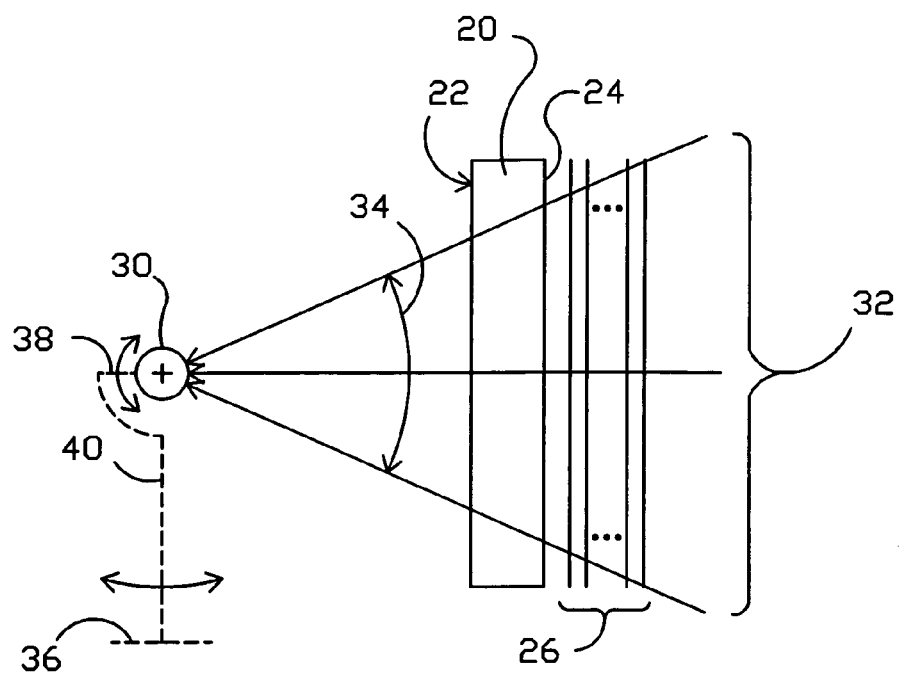
FIG. 1 is a diagram illustrating the basic principles of the invention.

The basic principles of the invention are illustrated in FIG. 1. A substrate 20, typically a window or a lens, has an interior side 22 and an exterior side 24. A tailored optical interference coating 26 is applied to at least one side of substrate 20; in the example shown, coating 26 is applied to the substrate's exterior side 24. Such a coating is characterized by being highly reflective for one or more light wavelengths, and transmissive for all other wavelengths. However, as noted above, the wavelength at which such a coating is highly reflective varies depending on the angle-of-incidence (AOI) of light impinging on it.

To overcome this problem, coating 26 is tailored such that it has different spectral characteristics at different locations on the substrate. An optical collection system 30, typically a human eye or a gimbaled optical sensor such as a silicon detector or a CCD focal plane array (as in a video camera), receives light 32 from or through the substrate over a limited range of angles—referred to herein as "prescribed angles of acceptance"—which depend on the relative positions of collection system 30 and substrate 20, as well as the collection system's aperture size, the number of axes about which it can rotate, and the amount of rotation allowed for each axis. Prescribed angles of acceptance 34 in one dimension are defined in FIG. 1; there would typically also be a prescribed range of angles for the horizontal direction. The prescribed angles of acceptance define a spatial area on the substrate over which light incident on the substrate can be sensed by optical collection system 30. Coating 26 is tailored such that optical collection system 30 sees a spectral content that is unchanged, or is changed in a prescribed manner, for predetermined AOI over the defined spatial area (when compared with light of normal incidence).

The substrate is typically made transparent, to allow incident radiation to pass through from exterior side 24 to interior side 22. The tailored coating may be deposited on the substrate's exterior side (as shown in FIG. 1), its interior side, or both. In addition, incoming light may be incident to exterior side 24, to interior side 22, or both.

One possible optical collection system 30 is an optical sensor mounted on a gimbal 36. The gimbal may arranged such that the sensor can rotate about a single axis, such as an axis 38 that would permit vertical rotation over prescribed range 34. In this case, the coating need be tailored to provide spectral variation in only one dimension. The gimbal might alternatively be arranged such that the sensor can rotate about two axes 38, 40, thereby providing horizontal rotation over a different prescribed range of angles (not shown); in this case, the coating is tailored to provide spectral variation in two dimensions.

The optical interference coating includes a plurality of layers deposited asymmetrically on substrate 20 to achieve the desired stabilized reflectance and transmittance spectra. The optical coating's properties are adjusted by varying the thickness of the layers that make up the coating. Deposition of the layers is preferably done asymmetrically, using vapor deposition and a mask. The coating and its formation are discussed in more detail below.

The present coating could be tailored in a number of different ways, depending on the application for which it is used. Already noted was tailoring the coating such that an optical collection system sees a spectral content that is essentially constant over prescribed angles of acceptance. The coating might also be tailored such that an optical collection system sees a spectral content that is changed in a prescribed manner over prescribed angles of acceptance. The coating might also be arranged to completely block certain wavelengths, or to significantly block all wavelengths except that of a laser used, for example, as a laser alignment tool. For example, when constant spectral behavior in two dimensions is desired, the coating thickness is made to increase with radial position on the optic, with radial position determined from the nominal 'forward-look' direction of the optical system.

Figure 2:
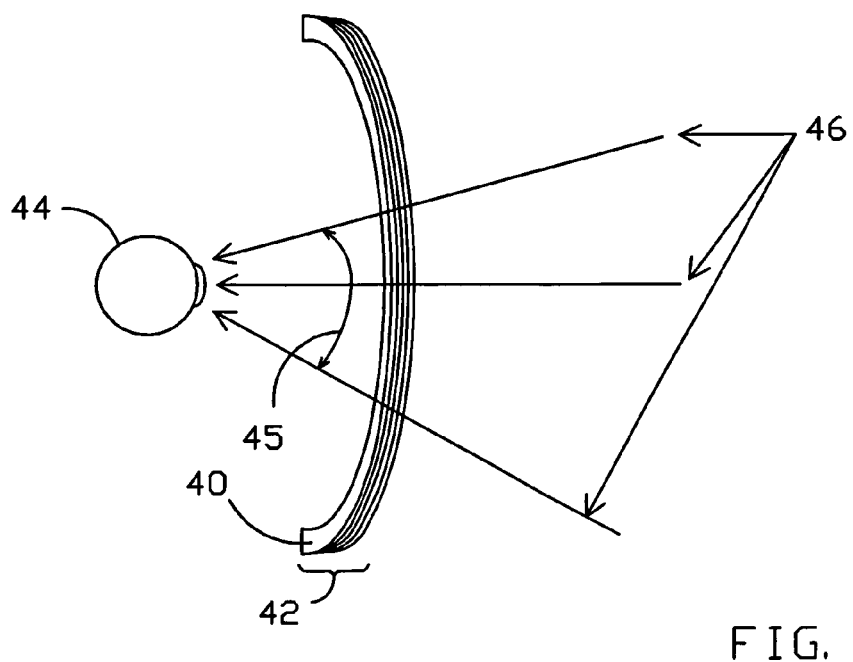
FIG. 2 is a diagram of one embodiment of an eyewear application in accordance with the present invention.

The present coating could be beneficially employed as a coating on the lenses of a pair of spectacles—particularly sunglasses. This application is illustrated in FIG. 2. Here, the substrate 40 is a curved spectacle (ophthalmic) lens, to which a tailored optical interference coating 42 is applied. Prescribed angles of acceptance 45 are defined for the optical collection system 44—here, a human eye—thereby defining a spatial area on substrate 40 through which light can be perceived. The coating is tailored such that incoming light 46 that reaches eye 44 is subjected to known reflectance and transmittance spectra for each point within the defined spatial area. If the coating is tailored so as to stabilize the spectrum, the optical performance of the spectacle lens—as perceived by the wearer—is consistent regardless of wearer's angular look direction (as long as it is within the prescribed angles of acceptance). Alternatively, the coating on a spectacle lens could be tailored to preferentially transmit those wavelengths for which the eye has greater visual acuity.

The coating could also be tailored to achieve a desired spectral response vs. angle when the optical system is fixed in the "look ahead" orientation. Consider a uniform optical coating on a sunglass that in the look ahead direction creates a circular color gradient to the wearer. A tailored optical coating can achieve a uniform perceived color here as well.

Figure 3:
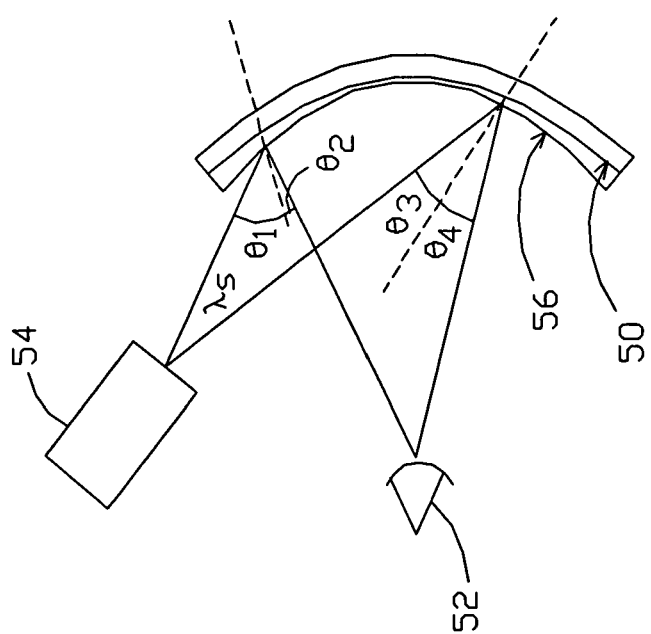
FIG. 3 is a diagram of one embodiment of a display application in accordance with the present invention.

One possible display application, which employs a tailored optical interference coating in accordance with the present invention, is shown in FIG. 3. A substrate 50 is placed within the field of vision of a viewer 52, such that it serves as a head- or helmet-mounted screen or visor. The viewer perceives light on and through substrate 50 over prescribed angles of acceptance that define a spatial area on surface 50. A projector 54, such as a laser scanner, projects visual content to be viewed—such as images and/or text—onto substrate 50. The light from projector 54 that is intended for viewing by viewer 52 includes a wavelength $\lambda_s$.

A tailored optical interference coating 56, characterized by being highly reflective for one or more light wavelengths and transmissive for all other wavelengths, is applied to substrate 50. As noted above, the wavelength at which such a coating is highly reflective varies depending on the AOI of light impinging on it; as such, some of the projected content may not be visible to viewer 52. To overcome this problem, the thickness of coating 56 is varied over substrate 50. The coating could be tailored such that viewer 52 sees a spectral content that is unchanged, or is changed in a prescribed manner, over the defined spatial area.

In a typical application, coating 56 is tailored such that it is highly reflective in a narrow band about $\lambda_s$ (or $\lambda_1, \ldots, \lambda_n$ if applicable) when the substrate is viewed over the prescribed angles of acceptance, such that the perceived reflectance spectrum is stabilized. For example, in FIG. 3, light from projector 54 might have a first AOI $\theta_1$ when viewed from a first angular look direction $\theta_2$, and have a second AOI $\theta_3$ when viewed from a second angular look direction $\theta_4$ (all measured with respect to a line normal to the display surface). If optical coating 56 has an even thickness and is designed to be highly reflective at $\lambda_s$ for an AOI of 0, it will be less reflective to wavelength $\lambda_s$ for non-zero AOI's such as $\theta_1$ and $\theta_3$. However, by properly varying the thickness of coating 56, substrate 50 can be made highly reflective at wavelength $\lambda_s$ over the prescribed angles of acceptance and corresponding AOIs. In this way, viewer 52 can see information and images projected onto the visor at wavelength $\lambda_s$ over the defined spatial area, as well as seeing through the visor.

The center wavelength $\lambda_\theta$ of the reflectance spectrum for a given optical interference coating 56 at a given AOI $\theta$ is approximately given by:

$$\lambda_\theta = \lambda_0 \sqrt{1 - \frac{n_0^2 \sin^2\theta}{n_a^2}} \quad \text{(Eq. 1)}$$

where $\lambda_0$=the center wavelength of the reflectance spectrum at normal incidence (AOI=0), $n_0$ is the coating's incident index of refraction, and $n_a$ is the coating's average index of refraction. To stabilize the reflectance spectrum as described above, the thickness of coating 56 is varied across substrate 50. The thickness of the coating for a given position (x,y) on substrate 50 is varied such that:

$$t(x,y) = (\lambda_0/\lambda_\theta) * t(0,0) \quad \text{(Eq. 2)}$$

where t(0,0) is the thickness of coating 56 required to make $\lambda_0 = \lambda_s$, and t(x,y) is the thickness of the coating at position (x,y). Calculating t(x,y) for all points of interest on substrate 50 produces a thickness profile for coating 56. When coating 56 is applied to surface 50 in accordance with the calculated profile, the reflectance spectrum is stabilized at all points of interest.

An optical interference coating 56 as described herein preferably comprises a stack of dielectric material layers, which are applied to a substrate. Such coatings are well known, and are described, for example, in U.S. Pat. Nos. 4,756,602 and 4,666,250, cited above. A coating well-suited for use with the present application is arranged to form a rugate filter, as described, for example, in U.S. Pat. No. 4,952,025 to Gunning, III, and in U.S. Pat. No. 5,004,308 to Hall et al.

In some applications, the light to be displayed includes n discrete wavelengths $\lambda_1, \ldots, \lambda_n$, to accommodate different text and/or image colors, such as red, green and blue, for example. In this case, an optical interference coating—applied, for example, to a substrate 50 as shown in FIG. 3—is arranged such that it is highly reflective in narrow bands around each of $\lambda_1, \ldots, \lambda_n$, with its thickness varied such that the substrate is reflective at wavelengths $\lambda_1, \ldots, \lambda_n$ when viewed over the prescribed angles of acceptance. In this way, all of the content at $\lambda_1, \ldots, \lambda_n$ can be perceived over the full viewing angle range. Coatings suitable for this purpose are described, for example, in U.S. Pat. No. 5,410,431 to Southwell.

Figure 4:
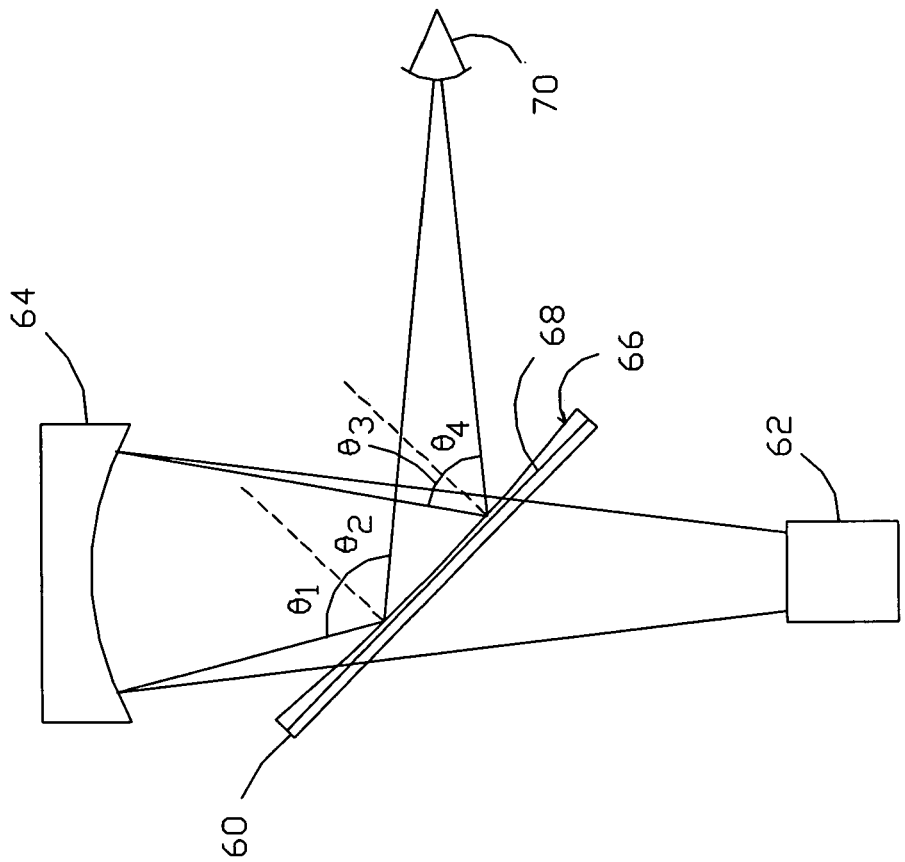
FIG. 4 is a diagram of another embodiment of a display application in accordance with the present invention.

The present invention can also be employed to tailor the perceived reflectance spectrum on the surface of a beam splitter or beam combiner; this is illustrated in FIG. 4. Here, the substrate comprises a beam splitter 60, which is placed between a projector 62, such as a laser scanner, and a curved mirror 64. An optical interference coating 66 is applied to a surface 68 of beam splitter 60 such that the surface is highly reflective for one or more light wavelengths, and transmissive for all other wavelengths. The scanner, mirror, and beam splitter are arranged such that an optical collection system 70 can perceive content which is projected onto surface 68 at the reflected wavelengths over a prescribed range of acceptance angles.

As in the arrangement shown in FIG. 3, the wavelengths at which a conventional optical coating is reflective vary depending on the AOI of light impinging on it. To overcome this, the thickness of coating 66 is varied over display surface 68, such that it is highly reflective in a narrow band about the wavelengths of interest when the surface is viewed over the prescribed angles of acceptance, such that the perceived reflectance spectrum is stabilized.

For example, in FIG. 4, light having a wavelength $\lambda_s$ is reflected from mirror 64 onto beam splitter 60 with a first AOI $\theta_1$ when viewed from a first angular look direction $\theta_2$, and with a second AOI $\theta_3$ when viewed from a second angular look direction $\theta_4$. If optical coating 66 has an even thickness and is designed to be highly reflective at $\lambda_s$ for an AOI of 0, it will be less reflective to wavelength $\lambda_s$ for non-zero AOI's such as $\theta_1$ and $\theta_3$. However, by properly varying the thickness of coating 66, display surface 68 is made highly reflective at wavelength $\lambda_s$ over the prescribed range of acceptance angles and corresponding AOIs, including $\theta_1$ and $\theta_3$.

Note that it is not essential that the present coating be tailored to stabilize the perceived reflectance spectrum. As noted above, the present coating can be tailored such that spectral content is unchanged, or is changed in a prescribed manner, over the defined spatial area.

The applications illustrated in FIGS. 1–4 are merely exemplary; the present invention is useful on a wide range of display surfaces.

Figure 5:
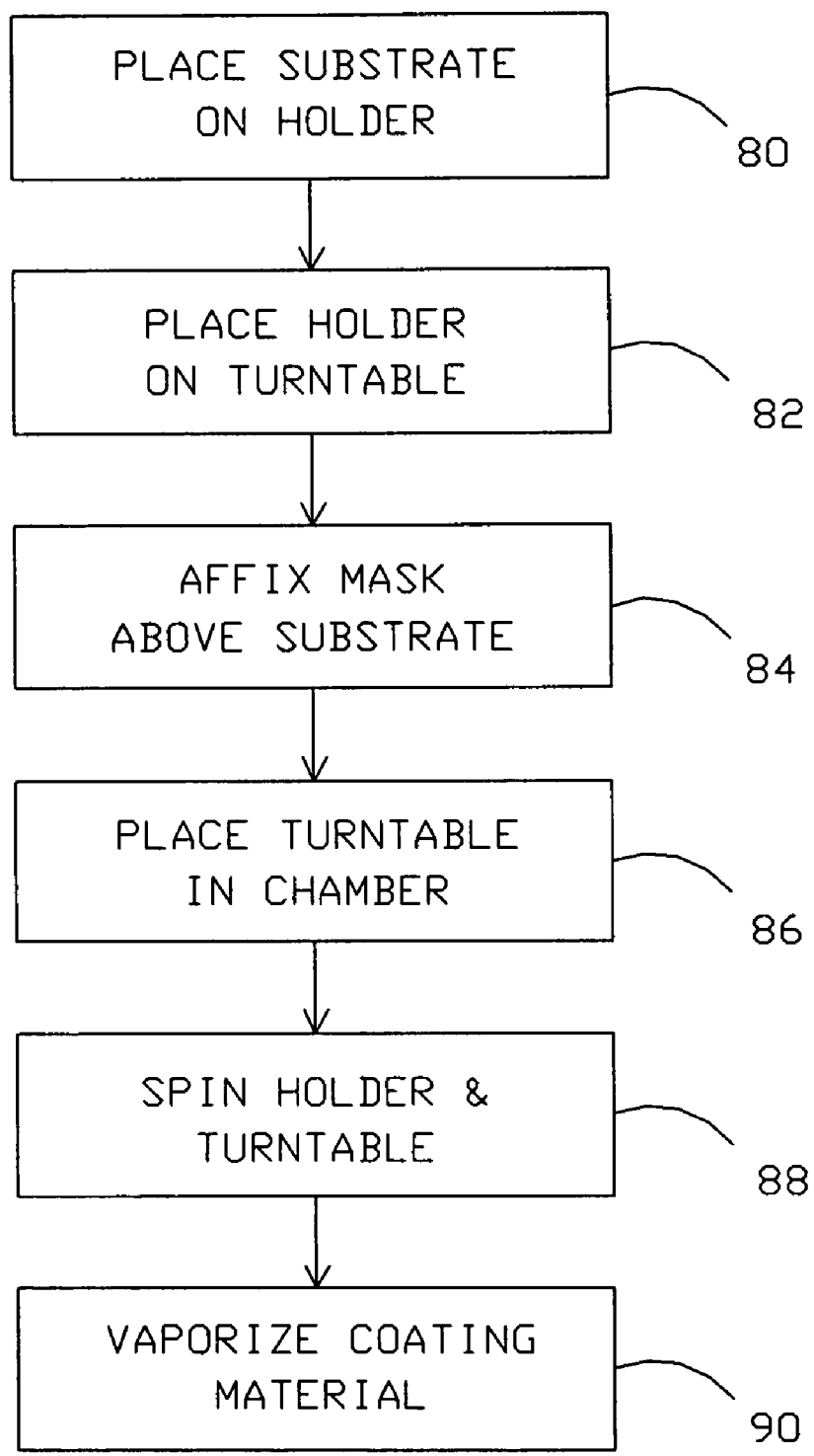
FIG. 5 is a flow chart illustrating a method of applying a tailored optical coating in accordance with the present invention.

One method of applying a variable-thickness optical interference coating onto a substrate involves the use of planetary deposition; one possible implementation of this method is shown in FIG. 5. A substrate to be coated is placed on a holder capable of spinning about a first axis (80). The holder is placed near the edge of a turntable capable of spinning about a second axis parallel to the first axis (82). A deposition mask is affixed between the substrate (84) and a deposition material source, and the turntable is placed into a chamber (86). The holder and turntable are spun about their respective axes (88), and a constituent material of the desired optical interference coating is deposited, such as by vaporization or sputtering, for example, on a surface of the substrate by means of planetary deposition. The mask is designed such that the material deposited on the substrate is thicker near the substrate's edges than near its center, thereby achieving the tailored variable coating thickness required to stabilize the substrate's perceived reflectance spectrum.

While particular embodiments of the invention have been shown and described, numerous variations and alternate embodiments will occur to those skilled in the art. Accordingly, it is intended that the invention be limited only in terms of the appended claims.

We claim:

1. An optical system, comprising:
   an optical collection system arranged to receive light over prescribed angles of acceptance;
   a substrate having interior and exterior sides which directs incident light to said optical collection system, said prescribed angles of acceptance defining a spatial area on said substrate; and
   an optical interference coating adjacent to at least one of said substrate sides, said coating tailored such that the spectral reflectance and spectral transmittance of radiation incident on said substrate are stabilized for predetermined angles of incidence for each point within said defined spatial area.

2. The system of claim 1, wherein said coating comprises a stack of dielectric material layers.

3. The system of claim 2, wherein said dielectric material layers are deposited asymmetrically on said substrate to achieve said prescribed spectral reflectance and spectral transmittance characteristics.

4. The system of claim 1, wherein said optical collection system is at a substantially fixed location with respect to said substrate.

5. The system of claim 4, wherein said optical collection system is a human eye.

6. The system of claim 4, wherein said optical collection system comprises an optical sensor.

7. The system of claim 6, wherein said optical sensor comprises a focal plane array.

8. The system of claim 6, wherein said optical sensor comprises a silicon detector.

9. The system of claim 4, wherein said optical collection system is gimbaled such that it rotates about at least one axis relative to said coated substrate.

10. The system of claim 4, wherein said optical collection system is gimbaled such that it rotates about two axes relative to said coated substrate.

11. The system of claim 1, wherein said substrate is a window.

12. The system of claim 1, wherein said substrate is a lens.

13. The system of claim 1, wherein said substrate is transparent to allow said incident radiation to pass through said substrate from said exterior side to said interior side.

14. The system of claim 1, wherein said incident radiation includes radiation incident to said exterior side and to said interior side of said substrate.

15. The system of claim 1, wherein said coated substrate comprises a beam-combiner and said optical collection system is at a substantially fixed location with respect to said substrate, said coating arranged such that a predetermined range of wavelengths of incident radiation is reflected and other wavelengths are transmitted by said coating to said collection system.

16. The system of claim 1, wherein said coated substrate comprises a beam-splitter and said optical collection system is at a substantially fixed location with respect to said substrate, said coating arranged such that a predetermined range of wavelengths of incident radiation is reflected and other wavelengths are transmitted by said coating to said collection system.

17. The system of claim 1, wherein said substrate is a spectacle lens.

18. The system of claim 17, wherein said spectacle lens is a sunglass lens.

19. The system of claim 1, wherein said optical collection system is at a substantially fixed location with respect to said substrate and said incident light includes a predetermined wavelength $\lambda_s$, said tailored optical interference coating arranged such that it is highly reflective only in a narrow band about $\lambda_s$ over said defined spatial area such that the reflectance spectrum perceived by said optical collection system is stabilized.

20. The system of claim 1, wherein said optical collection system is at a substantially fixed location with respect to said substrate and said incident light includes n discrete wavelengths $\lambda_1, \ldots, \lambda_n$, the thickness of said coating varied over said substrate such that it is highly reflective in narrow bands about $\lambda_1, \ldots, \lambda_n$ when viewed from said fixed location such that the perceived reflectance spectrum is stabilized.

21. The system of claim 1, wherein said coating forms a rugate filter.

22. The display of claim 1, wherein said coating is applied to said substrate by means of planetary deposition such that material deposited on said substrate is thicker near the substrate's edges than near its center.

23. An optical system, comprising:
   an optical collection system arranged to receive light over prescribed angles of acceptance;
   a substrate having interior and exterior sides which directs incident light to said optical collection system, said prescribed angles of acceptance defining a spatial area on said substrate; and
   an optical interference coating adjacent to at least one of said substrate sides, said coating tailored such that the spectral reflectance and spectral transmittance of radiation incident on said substrate are changed in a prescribed manner for predetermined angles of incidence for each point within said defined spatial area,
   wherein said optical collection system is at a substantially fixed location with respect to said substrate and said incident light includes a predetermined wavelength $\lambda_s$, said tailored optical interference coating arranged such that it is highly reflective only in a narrow band about $\lambda_s$ over said defined spatial area such that the reflectance spectrum perceived by said optical collection system is stabilized, and
   wherein the center wavelength $\lambda_\theta$ of said reflectance spectrum at a given angle of incidence (AOI) $\theta$ is approximately given by:

$$\lambda_\theta = \lambda_0 \sqrt{1 - \frac{n_0^2 \sin^2\theta}{n_a^2}}$$

where $\lambda_0$=the center wavelength of said reflectance spectrum at normal incidence, $n_0$ is the incident index of refraction for said coating, $\theta$ is the AOI of said light on said substrate (measured from the perpendicular), and $n_a$ is the coating's average index of refraction, and the thickness of said coating for a given position (x,y) on said substrate is varied such that:

$$t(x,y)=(\lambda_0/\lambda_\theta)*t(0,0)$$

where t(0,0) is the thickness of said coating required to make $\lambda_0=\lambda_s$ and t(x,y) is the thickness of said coating at position (x,y).

24. A head-mounted display visor, comprising:
a beam-combiner substrate on which light to be displayed to a viewer is directed, said light including a predetermined wavelength $\lambda_s$, said viewer at a substantially fixed location with respect to said substrate and arranged to receive light over prescribed angles of acceptance, said prescribed angles of acceptance defining a spatial area on said substrate; and
an optical interference coating on said substrate, the thickness of said coating varied over said substrate such that it is highly reflective only in a narrow band about $\lambda_s$ when said surface is viewed over any of said prescribed range of acceptance angles such that the reflectance spectrum perceived by said viewer is stabilized for predetermined angles of incidence for each point within said defined spatial area.

25. The visor of claim 24, wherein the center wavelength $\lambda_\theta$ of said reflectance spectrum at a given angle of incidence $\theta$ is approximately given by:

$$\lambda_\theta = \lambda_0 \sqrt{1 - \frac{n_0^2 \sin^2\theta}{n_a^2}}$$

where $\lambda_0$=the center wavelength of said reflectance spectrum at normal incidence, $n_0$ is the incident index of refraction for said coating, $\theta$ is the angle of incidence (AOI) of said light on said substrate (measured from the perpendicular), and $n_a$ is the coating's average index of refraction, and the thickness of said coating for a given position (x,y) on said substrate is varied such that:

$$t_{new}(x,y)=(\lambda_0/\lambda_\theta)*t_{old}$$

where $t_{old}$ is the thickness of said coating required to make $\lambda_0=\lambda_s$ and $t_{new}$ is the thickness of said coating at position (x,y).

26. The visor of claim 24, wherein said incident light includes n discrete wavelengths $\lambda_1, \ldots, \lambda_n$ the thickness of said coating varied over said substrate such that it is highly reflective in narrow bands about $\lambda_1, \ldots, \lambda_n$ when viewed from said fixed location such that the perceived reflectance spectrum is stabilized.

27. A spectacle lens, comprising:
a lens through which an eyeglass wearer perceives light over prescribed angles of acceptance, said prescribed angles of acceptance defining a spatial area on said lens; and
an optical interference coating adjacent to at least one side of said lens, said coating tailored such that the spectral reflectance and spectral transmittance of radiation incident on said lens are stabilized for predetermined angles of incidence for each point within said defined spatial area.

28. The lens of claim 27, wherein said coating is tailored to improve the visual acuity of said wearer.

29. The lens of claim 27, wherein said spectral reflectance and spectral transmittance of incident radiation on said lens are stabilized for predetermined angles of incidence for each point within said defined spatial area.

30. A method of stabilizing the spectral transmittance and reflectance of incident radiation on a substrate for prescribed angles of acceptance between said substrate and an optical collection system at a fixed location with respect to said substrate, comprising:
determining prescribed angles of acceptance between said substrate and said fixed location, which in turn define a spatial area on said substrate;
calculating the properties required of an optical interference coating at each point within said spatial area to achieve stabilization of said spectral transmittance and spectral reflectance of incident radiation for predetermined angles of incidence; and
depositing an optical interference coating on said substrate to achieve said stabilization of said spectral transmittance and reflectance of radiation for predetermined angles of incidence at each point within said spatial area.

31. The method of claim 30, wherein said coating comprises a stack of dielectric material layers and said optical interference coating properties are adjusted by spatially varying the thickness of said dielectric material layers.

32. The method of claim 31, wherein said stack of dielectric material layers are deposited asymmetrically on said substrate by vapor deposition to achieve said stabilized reflectance and transmittance of said incident radiation.

33. The method of claim 32, wherein said depositing is accomplished utilizing a deposition mask.

* * * * *